(12) United States Patent
Chandra et al.

(10) Patent No.: US 8,516,452 B2
(45) Date of Patent: Aug. 20, 2013

(54) FEEDBACK-DIRECTED CALL GRAPH EXPANSION

(75) Inventors: Satish Chandra, White Plains, NY (US); Stephen Fink, Yorktown Heights, NY (US); Manu Sridharan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 12/633,146

(22) Filed: Dec. 8, 2009

(65) Prior Publication Data

US 2011/0138369 A1    Jun. 9, 2011

(51) Int. Cl.
*G06F 9/44* (2006.01)

(52) U.S. Cl.
USPC ........................................................... 717/133

(58) Field of Classification Search
USPC ........................................................... 717/133
See application file for complete search history.

(56) References Cited

U.S. PATENT DOCUMENTS

| | | | |
|---|---|---|---|
| 6,240,549 B1 | 5/2001 | Hamada et al. |
| 6,374,368 B1 | 4/2002 | Mitchell et al. |
| 6,934,935 B1 | 8/2005 | Bennett et al. |
| 7,143,392 B2 | 11/2006 | Li et al. |
| 7,437,718 B2 | 10/2008 | Fournet et al. |

OTHER PUBLICATIONS

Arnold et al., "Collecting and Exploiting High-Accuracy Call Graph Profiles in Virtual Machines," INSPEC/IEEE, 2005.
Nguyen et al., "Efficient and Effective Array Bound Checking," ACM Digital Library, May 2005, pp. 527-570, vol. 27.
Bush et al., "A Static Analyzer for Finding Dynamic Programming Errors," Softw. Pract. Exper., 2000, 30(7):775-802.
Flanagan et al., "Extended Static Checking for Java," PLDI, 2002, pp. 234-245.
McCarthy, "Towards a Mathematical Science of Computation," Computer Science Department, Stanford University, 1996, pp. 1-25.
Xie et al., "A Scalable Framework for Error Detection using Boolean Satisfiability," ACM TOPLAS, 2007, 29(3):16.
Gulavani et al., "SYNERGY: A New Algorithm for Property Checking," FSE, 2006, pp. 117-127.
Beckman et al., "Proofs from Tests," ISSTA, 2008, pp. 3-13.
Cadar et al., "KLEE: Unassisted and Automated Generation of High-Coverage Tests for Complex Systems Programs," OSDI, 2008, pp. 1-16.
Visser et al., "Test Input Generation with Java PathFinder," ISSTA, 2004, pp. 97-107.
Taghdiri et al., "Inferring Specifications to Detect Errors in Code," Automated Software Engineering, International Conference on, 2004, 0:144-153.
Dolby et al., "Finding Bugs Efficiently with a SAT Solver," FSE, 2007, pp. 1-10.
Anand et al., "Demand-Driven Compositional Symbolic Execution," TACAS, 2008, pp. 1-15.
Babic et al., "Calysto: Scalable and Precise Extended Static Checking," ICSE, 2008, pp. 211-220.

(Continued)

*Primary Examiner* — Chun-Kuan Lee
(74) *Attorney, Agent, or Firm* — Walter W. Duft

(57) ABSTRACT

A technique for feedback-directed call graph expansion includes performing symbolic analysis on an interprocedural control flow graph representation of software code, skipping over a virtual method call in the control flow graph, using information obtained from the symbolic analysis as feedback to identify a target of the virtual method call, and iterating the symbolic analysis on a modified version of the control flow graph that associates the target with the virtual method.

20 Claims, 7 Drawing Sheets

(56) References Cited

OTHER PUBLICATIONS

Tok et al., "Efficient Flow-Sensitive Interprocedural Data-Flow Analysis in the Presence of Pointers," CC 2006, LNCS 3923, pp. 17-31.
Reynolds, "Separation Logic: A Logic for Shared Mutable Data Structures," LICS, 2002, pp. 1-20.
Barnett et al., "Weakest-Precondition of Unstructured Programs," Microsoft Research, undated, pp. 1-8.
McCarthy, "A Basis for a Mathematical Theory of Computation," MIT, Cambridge, MA, 1962, pp. 1-35.
Reps et al., "Precise Interprocedural Dataflow Analysis via Graph Reachability," POPL, 1995, pp. 1-14.
Sharir et al., "Two Approaches to Interprocedural Data Flow Analysis," 1978, pp. 1-146.

CODE EXAMPLE

```
1  public class Car {
2    int year;
3    void setYear(int y) { this.year = y; }
4    Int getYear() { return year; }
5  }
6  public class NewCarList implements List<Car> {
7    private Car[] elems = new Car[10];
8    public final Iterator iterator() {
9    return new Itr();
10   }
11   public Car set(int i, Car c) {
12       Car old = elems[i];
13       elems[i] = c;
14       return old;
15   }
16   private class Itr implements Iterator {
17       int cursor = 0;
18       public boolean hasNext() {
19           return cursor != elems.length;
20       }
21       public Object next() {
22           return elems[cursor++];
23       }
24   }
25   // other List methods...
26 }
27 public static void entrypoint(Collection<Car> c)       ◄─── ENTRY POINT
28   checkValid(c, c instanceof NewCarList);
29 }
30 private static void checkValid(Collection<Car> c,
31    boolean newCarsOnly) throws MyException {
32  Iterator<Car> it = c.iterator();
33  while (it.hasNext()) {
34      Car x = it.next();
35      if (newCarsOnly) {
36         int y = x.getYear();
37         if (y != 2009) {
38            throw new MyException(); // GOAL   ◄─── POST
39         }                                          CONDITION
40      }
41      // ... other checks.
42   }
43 }
```

*FIG. 2*

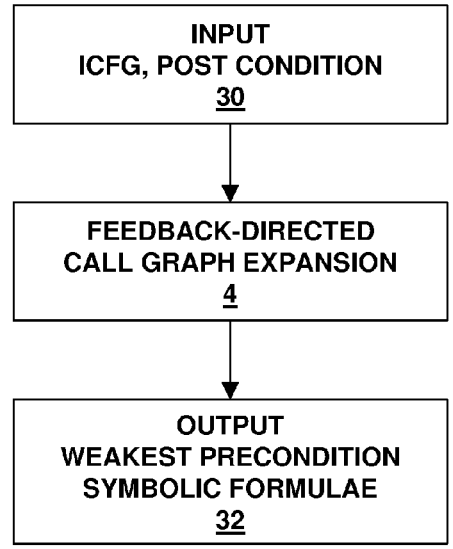

FIG. 3

| statement | edge condition | wp (statement,φ) |
|---|---|---|
| v = w | | φ[w/v] |
| v = v1 op v2 | | φ[(v1 op v2)/v] |
| v = w.f | normal successor<br>NPE successor | (w ≠ null) ∧ φ[read(f,w)/v]<br>(w = null) ∧ φ[fresh (NPE)/exc] |
| v.f = w | normal successor<br>NPE successor | w ≠ null) ∧ φ[update (f,v,w)/f]<br>(w = null) ∧ φ[fresh (NPE)/exc] |
| v = w[i] | normal successor<br>NPE successor<br>OOB successor | (w ≠ null) ∧ (i < read(length,w) ∧ i ≥ 0 ∧ φ[aread(a,w,i)/v]<br>(w = null) ∧ φ [fresh (NPE)/exc]<br>(w ≠ null) ∧ (i < 0 ∨ i ≥ read(length,w) ∧ φ [fresh(OOB)/v] |
| w[i] = v | normal successor<br>NPE successor<br>OOB successor | (w ≠ null) ∧ (i < read(length,w) ∧ i ≥ 0 ∧ φ [aupdate(a,w,i,v)/a]<br>(w = null) ∧ φ [fresh (NPE)/exc]<br>(w ≠ null) ∧ (i < 0 ∨ i ≥ read(length,w) ∧ φ [fresh(OOB)/v] |
| v = new T | | φ [fresh(T)/v] |
| assume c | | φ ∧ c |
| v1 = (T) v2 | CCE successor<br>normal successor | v2 ≠ null ∧ ¬(subType(typeOf(v2),T) ∧ φ [fresh(CCE)/exc]<br>v2 = null ∨ (subType(typeOf(v2),T) ∧ o [fresh(v2/v1] |
| return v | | φ [null/exc[v/ret] |
| W = v.m() | normal successor, callee meth<br>NPE successor | meth = dispatch(typeOf(v),m()) ∧ v ≠ null<br>(v = null) ∧ o [fresh(NPE)/exc] |

FIG. 4

| Functions and Constants | |
|---|---|
| $T_i$ | type constants (one per concrete type) |
| $M_i$ | method constants (one per concrete method) |
| $F_i$ | field constants (one per declared field) |
| $sig_i$ | constant corresponding to a method signature |
| read(f,v) | f(v), where f is Val → Val |
| | (a relational model of some declared field) |
| update(f,v,w) | functional update of f, i.e., f[v → w] |
| aread(a,v,i) | a(v,i), where a is Val × Index → Val |
| aupdate(a,w,i,v) | functional update of a, i.e., a[(w,i) → v] |
| typeOf(v) | the type of object to which v points |
| dispatch(t,sig) | method to which signature sig |
| | will dispatch to on receiver of type t |
| subType($t_1,t_2$) | true iff type $t_1$ is subtype of type $t_2$ in Java |

| Axioms |
|---|
| this ≠ null |
| $\forall f. \; \forall v. \; \forall w.$ read(update(f,v,w)) = w |
| $\forall f. \; \forall v. \; \forall w. \;\; u.u \neq \underline{v} \Rightarrow$ read(update(f,v,w),u) = read(f,u) |
| subtype($T_1,T_2$) $\iff$ $T_1$ is a subtype of $T_2$ in Java |
| dispatch(T1, sigA.m) = MB.m $\iff$ |
|    x.(x.class = T1 $\Rightarrow$ x.m() dispatches to target method B.m() |
|    x.read(length,x) ≥ 0 |

FIG. 5

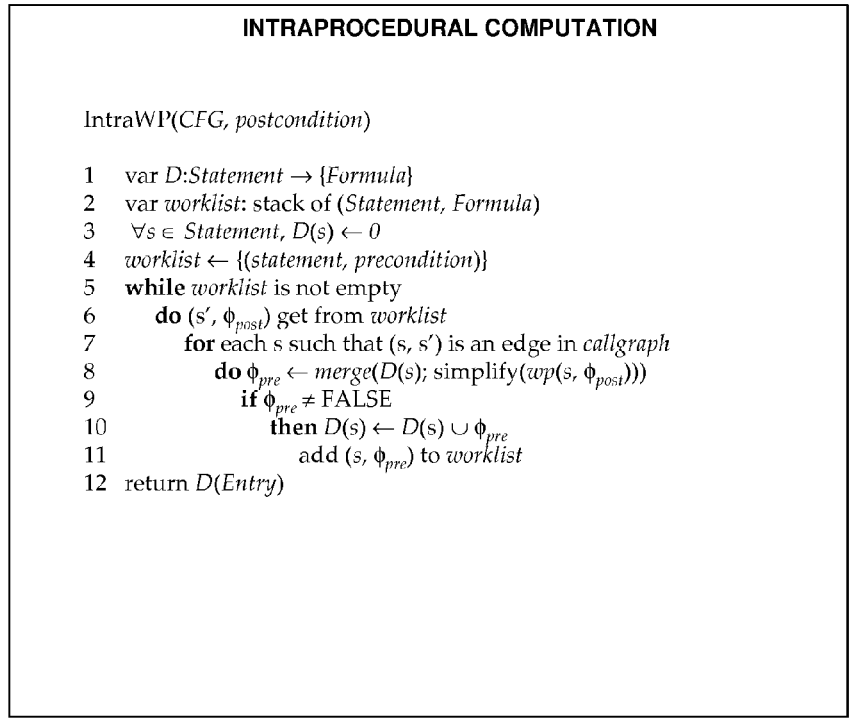

FIG. 6

FEEDBACK-DIRECTED CALL GRAPH EXPANSION

InterWPDemand(*ICFG, postcondition*)

1  var F: {*Formula*}
2  F ← InterWP(*ICFG, postcondition*)
3  F' ← {f ∈ F | f has no skolems ∧ f is satisfiable}
4  if F' ≠ 0
5     then return F
6     else for each t ∈ F
7        do choose $\sigma_{method}$ from t
8           choose m' ∉ targets($\sigma_{method}$, ICFG) s.t.
              t ∧ $\sigma_{method}$ = m' satisfiable
9           if no such m'
10             then continue
11          $ICFG_{new}$ ← ICFG with m' as possible target at site($\sigma_{method}$)
12          return InterWPDemand($ICFG_{new}$, postcondition)
       ▷ Failed to expand call graph
13 return ()

*FIG. 9*

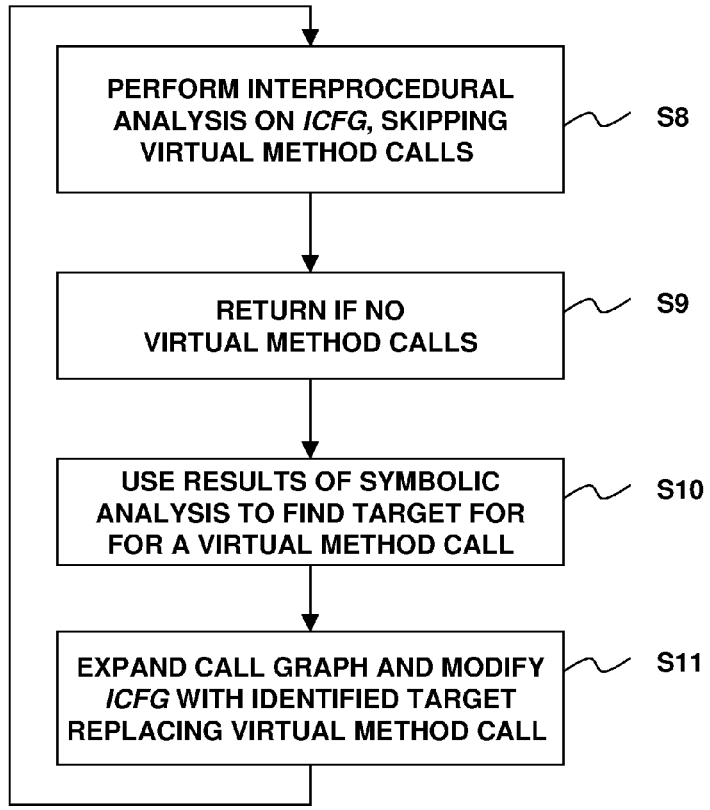

*FIG. 10*

FEEDBACK-DIRECTED CALL GRAPH EXPANSION

BACKGROUND

1. Field of the Invention

The present invention relates to computer systems and methods for evaluating, verifying and testing software program logic. More particularly, the invention concerns the use of weakest precondition analysis (or other forms of symbolic analysis) for object-oriented programs that support dynamic dispatch of functions and methods.

2. Description of the Prior Art

By way of background, weakest precondition (wp) analysis is a type of symbolic analysis that deals with the problem of finding a precondition $\phi$ that necessarily drives a software program from a particular entry point m to a goal state g. For example, g might represent some behavior of a library, such as a particular line of code throwing an exception. The discovered precondition $\phi$ could illustrate how to make such behavior occur when the library code is invoked. This type of analysis has numerous applications in tools for software engineering, including but not limited to (1) specification discovery and API (Application Program Interface) hardening, (2) bug validation, and (3) test case generation.

Real-world programs present many challenges for wp analysis. One problem arises from the sheer scale of large programs. Even in loop-free programs, wp analysis faces an exponential explosion due to the number of distinct paths through the program. In straight-line code alone, handling language features such as aliasing and type tests can require logical disjunctions, another source of state explosion.

Procedure calls further exacerbate these difficulties and introduce entirely new challenges stemming from the need to generate a call graph for interprocedural analysis. This is especially problematic for large object-oriented libraries and frameworks. For object-oriented programs, which support polymorphism and dynamic dispatch, performing the interprocedural analysis requires determining the possible targets of virtual method calls. Unfortunately, standard call graph construction algorithms face myriad difficulties disambiguating virtual calls in real-world libraries, due to the scale of the programs, unknown aliasing that clients might establish, and dynamic language features like reflection.

There is therefore a need for a software analysis technique that provides a new approach to wp analysis (and other forms of symbolic analysis), particularly for large object-oriented software environments.

SUMMARY

A technique for implementing feedback-directed call graph expansion is disclosed. According to an example embodiment, the technique includes performing symbolic analysis on an interprocedural control flow graph representation of software code while skipping over a virtual method call in the control flow graph. Using information obtained from the symbolic analysis as feedback, a target of the virtual method call is identified and the symbolic analysis is iterated on a modified version of the control flow graph that associates the target with the virtual method.

BRIEF DESCRIPTION OF THE DRAWINGS

The foregoing and other features of the disclosed subject matter will be apparent from the following more particular description of the example embodiment, as illustrated in the accompanying Drawings, in which:

FIG. 2 is a software code diagram showing example software code to be analyzed;

FIG. 3 is a functional block diagram showing example logic that may be implemented by the computing system of FIG. 1, and its input and output, to perform software analysis as disclosed herein;

FIG. 4 is a table showing example software statement representations and corresponding weakest precondition transformers;

FIG. 5 is a table showing example functions and constants that may be used in symbolic formulae produced by software analysis as disclosed herein, along with representative axioms;

FIG. 6 is a pseudocode diagram showing example operations that may be used to perform intraprocedural computation during software analysis as disclosed herein;

FIG. 9 is a pseudocode diagram showing example operations that may be used to implement feedback-directed call graph expansion during software analysis as disclosed herein;

FIG. 10 is a flow diagram showing a more generalized form of feedback-directed call graph expansion.

DETAILED DESCRIPTION OF EXAMPLE EMBODIMENT

Example Machine Environment

Figure 1:
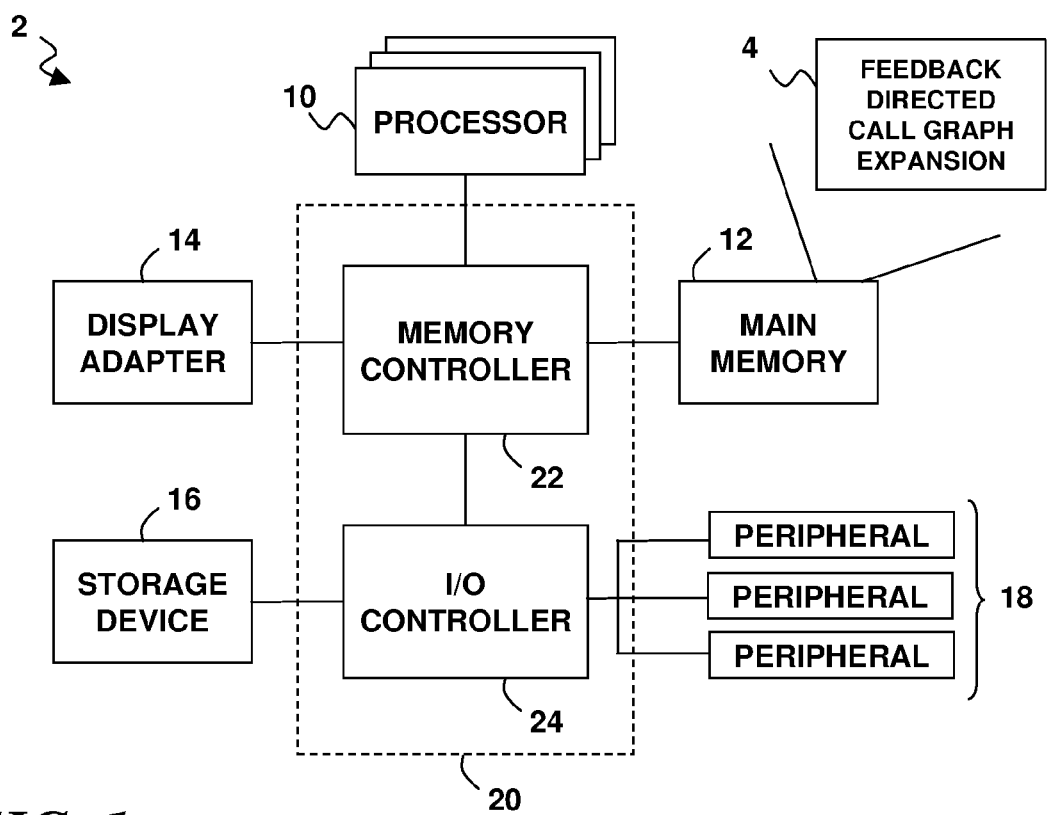
FIG. 1 is a functional block diagram showing an example computing system that may be used to perform software analysis as disclosed herein.

Turning now to the figures, wherein like reference numerals are used to represent like elements in all of the several views, FIG. 1 illustrates an example machine environment that may be used to perform software analysis as disclosed herein. In particular, an example computing system 2 is shown. The system 2 supports the execution of machine logic 4, which in turn controls the system 2 to perform symbolic analysis using a technique that will be referred to herein as feedback-directed call graph expansion. The system 2 may include one or more processors 10 that operate in conjunction with a main memory 12. As used herein, the term "processors" includes, but is not necessarily limited to, single-threaded or multi-threaded CPUs (Central Processing Units) within single-core or multi-core processor devices (each core being considered a CPU) that are designed to execute program instruction logic, such as software or firmware. The memory 16 may comprise RAM (Random Access Memory), ROM (Read-Only Memory), combinations of RAM and ROM, or any other type of tangible storage medium capable of storing data in computer readable form. The processors 10 and the memory 12 may be situated within a single computing node (e.g., as part of a single-node SMP system) or they may be distributed over plural nodes (e.g., as part of a NUMA system or cluster). Conventional cache memories (not shown) may be respectively associated with the processors 10.

Additional components of the system 2 may include a display adapter 14 for generating visual output information (e.g., text and/or graphics) to a display device (not shown), a persistent storage device 16 (e.g., a disk drive), and various peripheral devices 18 that may include a keyboard input device, a pointer input device, a network interface card (NIC), a USB bus controller, a SCSI disk controller, etc. A bus infrastructure 20, which may include a memory controller hub or chip 22 (e.g., a northbridge) and an I/O (input/output) controller hub or chip 24 (e.g., a southbridge), may be used to interconnect the foregoing elements. It should be understood that the foregoing description is for purposes of illustration only, and that other components and arrangements may also be used to implement the internals of the system 2

The logic 4 may be implemented in software, firmware, hardware or any combination thereof. If implemented in software, the logic 4 may be loaded from the persistent storage 16 into a portion of the main memory 12 that comprises RAM. If implemented in firmware, the logic 4 could reside in a portion of the main memory 12 that comprises ROM. The logic 4 could also be implemented using dedicated logic hardware.

Overview of Feedback-Directed Call Graph Expansion

Turning now to FIG. 2, an example Java™ code sequence is shown in order to illustrate how feedback-directed call graph expansion may be performed by the logic 4 using constraints discovered during symbolic analysis. For this code sequence, it is assumed that the goal is to discover a precondition for the public entrypoint( ) method at line 27 that will force program execution to line 38, which throws an exception within the checkValid( ) method that begins on line 30. This precondition could be useful either to find bugs or as documentation. In this case, it will be discovered that line 38 is reached if entrypoint is invoked with a NewCarList containing a Car whose year is not 2009.

By way of introduction, the logic 4 starts at line 38 of FIG. 2 and works backwards performing symbolic analysis to sequentially compute symbolic states (expressed as symbolic formulae) for each source code statement, all of which are preconditions for reaching the error. These symbolic states (the domain of the analysis), are as follows:

1. Before line 38, true
2. Before line 37, y≠2009
3. Before line 36, x.year≠2009.
4. Before line 35, x.year≠2009^newCarsOnly and so on. At each step of symbolic analysis, the logic 4 applies the code statement's wp transformer (described in more detail below) to a postcondition to arrive at a precondition.

The key challenge in analyzing the code of FIG. 2 is handling its virtual method calls. Continuing the above symbolic analysis computation backwards within the checkValid( ) method requires analyzing calls to the Iterator.next( ), Iterator.hasNext( ), and Collection.iterator( ) methods. These calls can have many possible targets in the application or libraries. For example, had this code relied on the Eclipse™ UI (User Interface) subsystem, there would be at least 86 concrete implementations of iterator( ), 135 implen-tations of hasNext( ), and 157 implementations of next( ). The question is which of these methods should logic 4 explore. Answering this question accurately is a requirement for efficient analysis of the example. In this case, when line 38 is reached from entrypoint( ) on line 27, a path condition constrains the receivers of these calls to the particular types NewCarList and NewCarList$Itr, as can be seen from lines 28 and 9, respectively.

Directed call graph expansion as implemented by the logic 4 of FIG. 1 uses an iterative approach to symbolic analysis and call graph construction. This technique works by iteratively skipping analysis of certain virtual method calls during symbolic analysis and then choosing real call targets based on feedback from the symbolic analysis, thereby building a call graph during successive passes. For example, in a first pass of backward symbolic analysis through lines 27-38 of FIG. 1, the logic 4 skips the calls to iterator( ), hasNext( ), and next( ) in the checkValid( ) method, reaching the entry of entrypoint( ) at line 27 with an initial symbolic formula that symbolically represents their return values and possible effects. Information obtained from the symbolic analysis is then used to make determinations about the skipped method calls. For example, on any backward path from line 38 to the entry of the entrypoint( ) method on line 27, the symbolic analysis will discover that there is a constraint that the variable c must be a subtype of NewCarList (due to line 28). With this constraint, the logic 4 can decide to expand the iterator( ) method call at line 32 to include the non-virtual method NewCarList.iterator( ) as a target for analysis, then iterate on the modified call graph. In this manner, the symbolic analysis gives crucial feedback to the interprocedural propagation.

Newly-added callees can influence which methods are added to the call graph in later analysis stages. For the example of FIG. 1, after adding NewCarList.iterator( ) method to the call graph, further symbolic analysis conducted in the next pass through the call graph will discover that this method returns an object of type NewCarList$Itr (line 9). This fact constrains the call graph expansion for the calls at lines 33 and line 34, forcing analysis of methods in NewCarList$Itr for subsequent passes. It will be seen that the call target selection is guided by the latest known symbolic constraints, in this case the concrete type of the return value from the NewCarList.iterator( ) method.

Advantageously, the above-described directed call graph expansion technique improves scalability because in practice, the analysis needs to only explore a small portion of an over-approximate (worst case) call graph. In contrast, an up-front static analysis would have difficulty determining the right part of the call graph to explore. The interleaving of interprocedural symbolic analysis and call graph expansion avoids this problem.

Example Data Representations For Symbolic Analysis

Having presented an overview of feedback-directed call graph expansion as implemented by the logic 4, additional details of an example embodiment may be described. Turning now to FIG. 3, the logic 4 is shown to operate on certain input data 30, and to perform feedback-directed call graph expansion as introduced above to produce output data 32. The input data 30 comprises an interprocedural control flow graph (ICFG) corresponding to the source code path to be analyzed, and the post condition for which the symbolic analysis is to be performed. The output data 32 comprises a list of symbolic states (the domain of symbolic analysis) that may be represented as quantifier-free symbolic formulae in first-order logic with equality.

As is known, a control flow graph (CFG) is a form of software flow diagram with each node of the graph representing some basic block of code, and with the edges between nodes representing jumps in control flow. The ICFG of the input data 30 may comprise one or more intraprocedural control flow graphs (CFGs), each representing a method having unique Entry and Exit nodes. If there are plural CFGs, they will be linked via edges from call sites in a calling CFG to the Entry and Exit nodes of a corresponding callee CFG.

An ICFG may be thought of as embodying a call graph—a directed graph representing the calling relationships between the methods of a software program. An ICFG stitches together a number of distinct CFGs, where each CFG represents a call graph node. Edges in the ICFG between CFGs represent procedure calls and returns. It will be appreciated that the input ICFG defines a call graph to the extent that the ICFG contains calls to non-virtual methods (i.e., methods whose class can be determined). These methods have known CFGs that are linked into the ICFG. Virtual method calls, on the other hand, target unknown CFGs. The initial call graph represented by the input ICFG does not identify or link to these CFGs, and is thus incomplete. However, as indicated in the Overview section, the logic 4 expands the call graph during successive iterations of symbolic analysis. During each iteration, the logic 4 uses information obtained from the symbolic analysis to choose call targets, identify new CFGs, and link them into the ICFG. Ultimately, at the end of processing, a suitable call graph will be defined containing nodes for all methods called within the software being analyzed. The output 32 will contain a complete set of symbolic formulae derived from a satisfactory ICFG representation of the source code.

One example source code representation that may be used to build CFGs is an SSA (Static Single Assignment) register-transfer language (RTL) representation wherein each basic CFG block corresponds to one statement of the source code. For the Java™ code example of FIG. 2, the RTL representation may be selected to closely follow the semantics of Java™ bytecode. An example of such an RTL representation is shown in the left-hand column of FIG. 4, which illustrates a set of example RTL statements. The right-hand column of FIG. 4 shows a set of corresponding wp transformers that may be used by the logic 4 to perform symbolic analysis. The wp transformers are discussed in more detail below in connection with FIG. 5, which presents the vocabulary of the symbolic formulae generated during symbolic analysis. Continuing with reference to FIG. 4, the v, w and c variables represent symbolic registers in the input language, and corresponding free variables in the logic. They can hold values of either primitive types (integers, reals) or pointers. The assume statement is a no-op if its condition is true and hangs otherwise. Following a conditional branch with condition c, the taken branch jumps to assume(c) and the not taken branch to assume(!c). Note that many statements can throw implicit exceptions corresponding to built-in Java™ safety conditions. The abbreviations NPE, CCE and OOB respectively correspond to null pointer, class cast and array index out of bounds exceptions. The exc variable is a special variable that holds a pointer to an exception that has been raised but not caught. The ret variable represents the return value. The fresh (T) function returns a fresh value v from the domain of pointers, such that typeOf(v)=T. It will be appreciated other representations of the source code may also be used, and that the representation illustrated in FIG. 4 is described for purposes of example only.

During symbolic analysis, logic 4 will operate on an ICFG built over the foregoing representation of the source code (or any other suitable source code representation). Each CFG within the ICFG may be created such that each basic block corresponds to at most one statement. As indicated above, each CFG has a unique Entry node and a unique Exit node. Each block has distinct outgoing edges corresponding to normal execution and different cases of exceptional execution. Exceptional edges from a potentially excepting statement go either to catch blocks or to the Exit node.

As previously mentioned, the logic 4 represents symbolic states as quantifier-free symbolic formulae in first-order logic with equality. FIG. 5 informally presents an example of some of the vocabulary that may be used for this logic, and also shows some representative axioms. In addition to primitive values and pointers, the vocabulary expresses relations between types, methods, fields and method signatures. The logic models Java™ fields as relations manipulated with read and update from the theory of arrays (see J. McCarthy, "A Basis for a mathematical theory of computation," Technical Report, MIT, Cambridge, Mass. (1992)). Java™ arrays (which are heap-allocated) are modeled with two-dimensional arrays (from the theory), indexed by a base pointer and an array index. The bottom half of FIG. 5 shows some representative axioms, such as the standard axioms that define the theory of arrays. Additionally, FIG. 5 shows axioms based on the type hierarchy of the program. The last axiom ensures that the length field of arrays is non-negative.

Returning now to FIG. 4, the right-hand column defines weakest precondition transformers for several statements. The variable $\phi$ represents the post condition $\phi_{post}$ of a given CFG block. The bracketed matter represents the transformer logic that transforms $\phi_{post}$ into the weakest precondition $\phi_{pre}$ for the statement. For example, the wp transformer $\phi[w/v]$ in the row two of FIG. 4 means that the precondition $\phi_{pre}$ is found from the post condition $\phi_{post}$ by replacing all syntactic occurrences of v with w. Line 36 of the source code of FIG. 2 shows how this wp transformer works. The statement of line 36 is y=x.getYear( ). The post condition $\phi_{post}$ is y≠2009. According to the $\phi[w/v]$ wp transformer, the precondition $\phi_{pre}$ for this statement is found by replacing x.year (getYear( ) returns year) for y. Similarly, the wp transformer $\phi \wedge C$ in row eight of FIG. 4 means that the precondition $\phi_{pre}$ is found from the post condition $\phi_{post}$ by logically ANDing $\phi_{post}$ with C. Line 35 of the source code of FIG. 2 shows how this wp transformer works. The statement of line 35 is if (newCarsOnly). The post condition $\phi_{post}$ is x.year≠2009. According to the $\phi \wedge C$ wp transformer, the precondition $\phi_{pre}$ for this statement is found by ANDing x.year≠2009 with newCarsOnly, which is written as x.year≠2009 $\wedge$ newCarsOnly.

Technically, the wp transformer occurs on the outgoing edge from a basic CFG block. For some statements, symbolic analysis must take into account whether the CFG edge represents normal or exceptional control flow, as indicated in the middle column of FIG. 4. Note that the wp transformer for calls in FIG. 4 only handle intraprocedural semantics within a single CFG (i.e., reasoning about non-nullness of receivers and virtual dispatch). Intraprocedural computation within a given CFG is described in the next section. Thereafter, interprocedural computation within an ICFG comprising two or more CFGs is described for the case where all callee CFGs are known. In further sections, the details of iterative feedback-directed call graph expansion to handle virtual method calls and unknown callee CFGs are described.

Intraprocedural Computation

Turning now to FIG. 6, example pseudocode illustrating how the logic 4 may compute intraprocedural weakest preconditions within a single CFG is shown. The intraprocedural analysis (referred to as IntraWP( )) computes a set D of symbolic states at each program point of the CFG. Line 1 of FIG. 6 declares the set D. Line 2 of FIG. 6 declares a worklist that is used to hold statements and corresponding precondition symbolic formulae that need to be processed during backward propagation through the CFG. Line 3 of FIG. 6 initializes set D. Line 4 of FIG. 6 adds the first entry to worklist, which is the Exit statement of the software to be analyzed and its precondition determined from the goal state of interest. Line 5 of FIG. 6 initiates a while-loop that continues until worklist is empty. Line 6 of FIG. 6 fetches an entry from worklist, designating the statement as s'. The statement's precondition symbolic formula is designated as the post condition $\phi_{post}$ for one or more statements that immediately precede s' in the backward flow path. Line 7 of FIG. 6 initiates a for-loop that implements backward propagation from the statement s' along one or more edges of the CFG to the one or more statements s that precede s'. Lines 8-11 of FIG. 6 are then performed for each s. Line 8 of FIG. 6 computes the precondition $\phi_{pre}$=(wp(s, $\phi_{post}$) for s, optionally invokes a simplifier on the result (see example below), and merges the simplified result with facts already known about statement s in set D (e.g., from a previous iteration through IntraWP( ). Line 9 of FIG. 6 performs a validity test on $\phi_{pre}$ and line 10 adds s and $\phi_{pre}$ to set D. Line 11 adds s and $\phi_{pre}$ to worklist. Line 12 of FIG. 6 returns set D with the final symbolic formula representing the precondition of the software to be analyzed.

Figure 7:
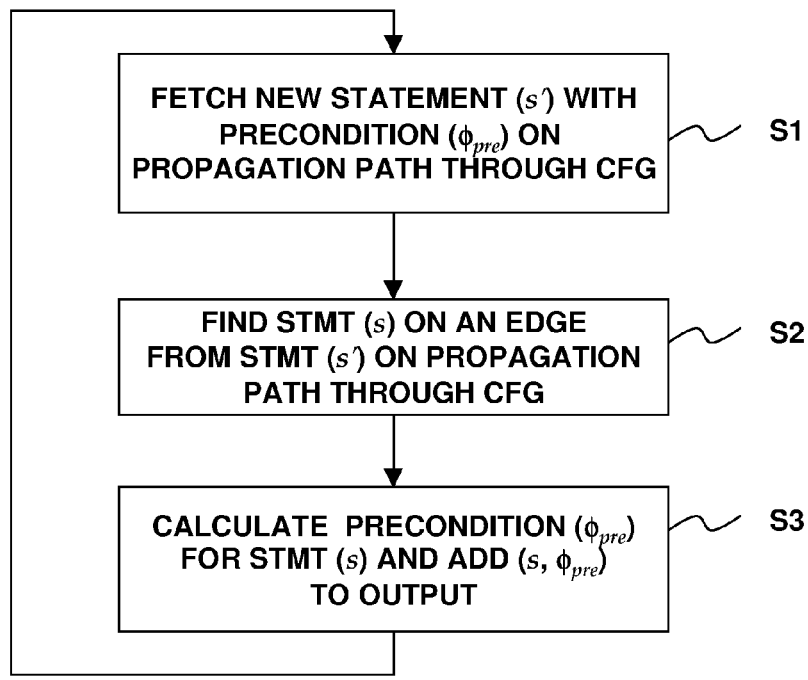
FIG. 7 is a flow diagram showing a more generalized form of intraprocedural computation.

FIG. 7 is a flow diagram illustrating the intraprocedural computation performed by the logic 4 in more general terms for the simple case where no statement in the CFG has more than one edge to any preceding statement. Block S1 fetches a new statement s' with a precondition $\phi_{pre}$ on the propagation path through the CFG. Block S2 finds a statement s on an edge from statement s' on the propagation path. Using the precondition $\phi_{pre}$ of statement s' as the post condition $\phi_{post}$ for statement s, block S3 calculates the precondition $\phi_{pre}$ for statement s and adds (s, $\phi_{pre}$) to the output.

To illustrate the foregoing, consider the method setYear( ) on line 3 of the example Java™ code of FIG. 2. Assume that the goal is find the precondition for the predicate x.year==2008, at the normal exit of setYear( ), where x is some global variable. The symbolic state representing this predicate and the normal execution of setYear( ) is exc=null ∧ read(year,x)=2008 at the exit of setYear( ). Traversing setYear( ) backwards, the analysis first encounters a return statement (not shown in code). Applying the wp transformer for the return statement (see line 10 of FIG. 4) substitutes null for exc, giving read(year,x)=2008. Applying the wp transformer to the putfield statement at line 3 of the code (see line 4 of FIG. 4) produces this≠null ∧ read(update(year, this, y)x)=2008. If desired, before propagating this formula, simplification can be performed using the axiom this null to obtain the simpler formula read(update(year, this,y)x)=2008. If later in the analysis, some path condition ensures that this=x, the further simplification can be performed, based on the theory of arrays, resulting in y=2008.

Interprocedural Computation

Having now described a technique that may be used by the logic 4 to calculate weakest preconditions for intraprocedural code, the next stage of interprocedural computation implemented by the logic 4 may be described for the simple case where there are known procedure calls, and no virtual method calls. The symbolic analysis performed by the logic 4 handles procedure calls in a context-sensitive manner. As stated, only realizable interprocedural paths are considered. Context sensitivity is accomplished through a functional approach (see M. Sharir and A. Pnueli, "Two Approaches To Interprocedural Data Flow Analysis," Chapter 7, pages 189-233, Prentice Hall (1981)) based on the Reps-Horwitz-Sagiv (RHS) tabulation algorithm (see T. Reps, S. Horwitz, and M. Sagiv, "Precise Interprocedural Dataflow Analysis Via Graph Reachability," POPL (1995)), which is enhanced to handle merge functions and combinations of local and non-local flows at return sites. The analysis operates over an ICFG comprising CFGs linked via edges from call sites in caller CFGs to and from the Entry and Exit nodes in corresponding callee CFGs. Each CFG is analyzed using intraprocedural symbolic analysis as described in the previous section. A single global worklist holds the pending work (symbolic states to propagate). The algorithm does not have to completely analyze a callee before continuing work in the caller. The global worklist effectively manages instances of intraprocedural analysis as co-routines. Analogously to the problem with loops in intraprocedural analysis, the procedure may not terminate in the presence of recursion.

Figure 8:
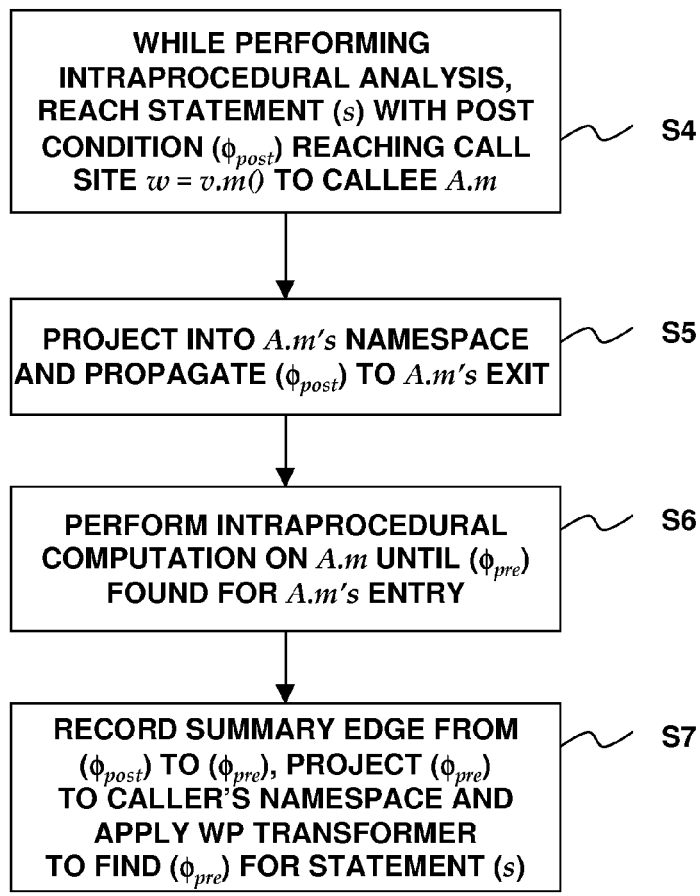
FIG. 8 is a flow diagram showing interprocedural computation that may be performed during software analysis as disclosed herein.

A technique that may be used by the logic 4 to propagate symbolic formula to and from a callee CFG will now be described with reference to the flow diagram of FIG. 8. Suppose (in block S4 of FIG. 8) a formula $\phi$ reaches a call site w=v.m( ), and assume there exists one possible callee A.m. (for multiple possible callees, the procedure may be iterated over each callee). As shown in block S5, the symbolic analysis first projects into A.m's namespace—substituting formals for actuals, and so on—and propagates the resultant post condition $\phi_{post}$ to A.m's Exit. In block S6, this symbolic state then propagates through A.m via intraprocedural analysis, processing any further calls recursively. Whenever as a result of this propagation, a precondition symbolic formula $\phi_{pre}$ reaches A.m's Entry, a summary edge $$A.m( ), \\ \phi_{post} \rightarrow \phi_{pre}$$

is recorded (in block S7), indicating that $\phi_{pre}$ is a sufficient precondition to ensure reaching the post condition $\phi_{post}$ at the A.m's Exit. Note that for a single post condition $\phi_{post}$, symbolic analysis may discover many sufficient preconditions as it explores more paths. Finally, the processing of block S7 completes, applying the summary edge to the call site in the caller CFG by projecting A.m's precondition $\phi_{pre}$ to the caller's namespace and conjoining it with wp (w=v.m( )), described in FIG. 4. If desired, summary edges may be cached and reused when identical symbolic formulae propagate to an Exit node (see T. Reps, S. Horwitz, and M. Sagiv, "Precise Interprocedural Dataflow Analysis Via Graph Reachability," POPL (1995)).

Directed Call Graph Expansion

As previously stated, the above discussion addresses how the logic 4 may perform interprocedural analysis in the simple case where there are only realizable interprocedural paths. The discussion does not address the central challenge mentioned by way of introduction above, namely, finding a call graph to use when faced with high degrees of polymorphism. This section presents details of the feedback-directed call graph expansion technique introduced in the Overview section above, a technique wherein the logic 4 uses feedback from symbolic analysis to expand the call graph. Feedback-directed call graph expansion requires analyzing a software program in phases. The first phase performs symbolic analysis while skipping over all virtual method calls. If this analysis finds a satisfiable precondition through a path that does not have any virtual method calls, the computation terminates, having found a call-free feasible path that reaches the goal. Otherwise, the algorithm expands the call graph in one or more subsequent phases, adding a callee to some call site during each phase. The key insight is that constraints from symbolic analysis guide the choice of call site and target during each phase.

Virtual method calls are skipped by modifying the intraprocedural wp computation used for method calls of the form w=v.m( ). An example of this type of method call is shown in the third row of FIG. 4 (which illustrates the statement v=w.f and its corresponding wp transformers). To facilitate directed call graph expansion, the wp transformers for such virtual method calls are replaced by skolem constants—essentially existentially quantified variables—to represent the constraints introduced by the skipped methods. Thus, for the call w=v.m( ), four types of fresh skolem constants may be used:

1. $\alpha_{ret}$ represents the undetermined return value assigned to w.
2. $\alpha_{method}$ represents the undetermined target of the method dispatch; constraints on this variable guide selection of a target when expanding the call.
3. For each field f referenced in the post condition of the call, $\alpha_f$ captures the undetermined side-effects of the method on f. An uninterpreted function mod is may be introduced, where mod(f, $\alpha_f$) is an array term (in the theory of arrays) that represents the updates to the relation f performed by the callee. Java™ arrays are handled similarly.
4. $\alpha_{exc}$ represents the undetermined exception value generated during the execution of the method.

An example modified wp analysis for skipped calls (non-exceptional case only), follows:

$$wp(w=v.m(\ );\phi)=\alpha_{method}=\text{dispatch}(\text{typeOf}(v),m(\ ))$$
$$\wedge\ v\neq \text{null}$$
$$\wedge\ \phi[\alpha_{ret}/w][\alpha_{exc}=\text{exc}][\text{mod}(f;\ \alpha_f)/f]^{(*)}$$
((*) for each field and array)

FIG. 9 illustrates example pseudocode illustrating how the logic 4 may implement feedback-directed call graph expansion using the modified wp transformer described above. This procedure (referred to as InterWPDemand( )) receives an input ICFG and a specified postcondition (shown as input 30 of FIG. 3). The procedure computes a set of symbolic formulae F, representing a set of satisfiable preconditions at program entry, using interprocedural symbolic analysis applied in successive iterations of call graph expansion. Information obtained from each iteration of symbolic analysis is used to expand the call graph, linking new CFGs to ICFG until a satisfactory representation of the software is obtained that allows the final set of symbolic formulae F to be determined. Line 1 of FIG. 9 declares the set of symbolic formulae F. Line 2 implements the interprocedural analysis (referred to as InterWP( )) using the input ICFG and the postcondition to produce the set of symbolic formulae F.

The InterWP( ) procedure uses substantially the same interprocedural computation described the preceding section. However, virtual method calls are skipped by introducing skolem constants into their symbolic formulas (as described above). Line 3 of FIG. 9 tests to determine if InterWP( ) produced any skolem constants. If not, the analysis has found a satisfiable precondition through a path that does not have any virtual method calls, and the computation terminates, returning a set of symbolic formulae F' in line 5 after testing its validity in line 4. Line 6 is reached if skolem constants are found in each formula F.

Line 6 starts a for-loop (spanning lines 6-12) that attempts to expand the call graph. This loop iterates over each symbolic formula t in F that contains a skolem constant. Line 7 chooses the undetermined method dispatch target $\sigma_{method}$ from t. Line 8 attempts to find a target method m' for $\sigma_{method}$ that is not already known in the ICFG. Note the satisfiability check in line 8, showing how symbolic constraints influence the choice of call targets. Note further that the analysis allows for expanding multiple targets at a call site. This functionality is needed not only for calls with multiple possible targets, but also for cases when a callee is feasible according to constraints over skolem constants, but has behavior incompatible with the post-condition (e.g., if a non-null return value is needed and the expanded callee always returns null). Lines 9 and 10 continue the for-loop to process the next t if no satisfiable m' is found. Otherwise, line 11 expands the call graph and creates $ICFG_{new}$ from ICFG using m' as a possible target at call site ($\sigma_{method}$). Line 12 iterates by calling InterWPDemand( ) with $ICFG_{new}$. Line 13 returns with no solution if InterWPDemand( ) fails to expand the call graph.

FIG. 10 is a flow diagram illustrating in more general terms how the logic 4 may implement feedback-directed call graph expansion. Block S8 performs interprocedural analysis on an input ICFG, skipping virtual method calls as it does so. Block S9 returns if no virtual method calls are found. Block S10 uses the results of symbolic analysis to find a target for a virtual method call skipping during block S8. Block S11 expands the call graph—modifying the ICFG with the target identified in block S10, then recurses to block S8 to iterate the interprocedural analysis using the modified ICFG.

Directed Call Graph Expansion Example

This example illustrates in detail how the logic 4 may perform feedback-directed call graph expansion on the example Java™ code of FIG. 2, as was discussed at a high level in the Overview section above. Recall that the goal is to find a concrete execution from the beginning of entrypoint to line 38. The example focuses on a loop-free backwards path π going through lines 37, 36, 35, 34, 33, 32 and 28. The starting symbolic formula that propagates backward from line 38 is simply true, i.e., the line was executed.

Phase 1:

In the first phase, the input ICFG contains methods entrypoint( ), checkValid( ) and Car.getYear( ). For expository purposes, it is assumed that the monomorphic call to Car.getYear( ) has already occurred. During interprocedural analysis propagation along a path π through the ICFG, the skolem constants are introduced for the method calls iterator( ), hasNext( ), and next( ), whose targets do not appear in the initial ICFG and so are skipped. The skolem constants may include:

For next( )—$\alpha_{method,n}$, $\alpha_{exc,n}$, $\alpha_{ret,n}$, and $\alpha_{year,n}$
For has.Next( )—$\alpha_{method,h}$, $\alpha_{exc,h}$, $\alpha_{ret,h}$, and $\alpha_{year,h}$
For iterator( )—$\alpha_{method,i}$, $\alpha_{exc,i}$, $\alpha_{ret,i}$, and $\alpha_{year,i}$ The exc and the $\alpha_{exc}$ variables may be omitted from the discussion insofar as they are not relevant in this example. The formula that reaches the entry of entrypoint( ) follows, applying the appropriate flow functions (wp transformers) from FIG. 4 for each statement in the path:

$\alpha_{method,n}$=dispatch(typeOf($\alpha_{ret,i}$), next( ))
$\wedge\ \alpha_{method,h}$=dispatch(typeOf($\alpha_{ret,i}$), hasNext( ))
$\wedge\ \alpha_{method,i}$=dispatch(typeOf(c); iterator( ))
$\wedge$ read(mod(mod(mod(year, $\alpha_{year,i}$), $\alpha_{year,h}$), $\alpha_{year,n}$), $\alpha_{ret,n}$)=2009
$\wedge\ \alpha_{ret,h}$=true
$\wedge$ c≠null^$\alpha_{ret,n}$≠null^$\alpha_{ret,i}$≠null
$\wedge$ subType(typeOf($\alpha_{ret,n}$), Car)
$\wedge$ subType(typeOf($\alpha_{ret,i}$), Iterator)
$\wedge$ subType(typeOf(c), NewCarList)

The "read" term arises from analyzing Car.getYear( ), and the nested mod terms compositionally indicate the possible side effects of skipped methods on contents of the year field.

The preceding formula is satisfiable. However, it contains skolem constants, indicating that the path which generates this formula skipped over some calls. Hence, the logic 4 must expand the call graph, trying to find a path with no skipped calls. Suppose it selects to expand the call to iterator (line 32) next. The type constraint subType(typeOf(c), NewCarList) indicates that c must be of type NewCarList. This constraint arises from the instanceof check at line 28. Hence, the logic 4 concludes that $\alpha_{method,i}$=newCarList.iterator( ), expands the call graph accordingly, and recurses using the new ICFG.

Phase 2:

The logic 4 next performs symbolic analysis over the expanded call graph. This time the following symbolic state reaches entry, indicating two skipped method calls on the path:

$\alpha_{method,n}$=dispatch(NewCarList$Itr, next( ))
∧ $\alpha_{method,h}$=dispatch(NewCarList$Itr, hasNext( ))
∧ read(mod(mod(year, $\alpha_{year,h}$), $\alpha_{year,n}$), $\alpha_{ret,n}$)=2009
∧ $\alpha_{ret,h}$=true^c≠null^$\alpha_{ret,n}$≠null
∧ subType(typeOf($\alpha_{ret,n}$), Car)
∧ subType(typeOf(c), NewCarList)

Note that because NewCarList.iterator has been analyzed, the concrete type NewCarList$Itr returned by the method now appears in the dispatch constraints.

Phases 3 and 4:

Continuing, the targets for next( ) and hasNext( ) are successively added to the call graph, both drawn from NewCarList$Itr. After these two phases, the following symbolic state reaches Entry:

c≠null ∧ c:elems≠null
∧ c.elems.length>0 ∧ c.elems[0]≠null
∧ c.elems[0]:year≠2009^subType(typeOf(c), NewCarList)

For clarity, the notation x.foo is written for read(foo, x), where foo cannot be an update or mod term. Because this formula contains no skolem constants, it represents a path with no skipped calls. A reader may verify that this precondition at entrypoint would indeed lead the execution to goal.

Note that the order in which calls are expanded can affect performance significantly. For example, if the logic 4 insisted on expanding the next( ) call at line 34 of FIG. 2 first, it may have tried many possibilities before finding the method corresponding to NewCarList. The logic 4 may thus employ simple heuristics to determine a profitable order to expand calls. Furthermore, the logic 4 may heuristically expand more than one in a stage, especially calls to small methods and single-dispatch calls.

Accordingly, a technique has been disclosed for implementing feedback-directed call graph expansion wherein call graph expansion is guided by constraints discovered during symbolic analysis. In the example embodiment, call graph expansion and symbolic analysis are interleaved, with feedback from the symbolic analysis being used to only explore promising parts of the call graph, thereby obviating the need to exhaustively explore a large, conservative call graph.

It will be appreciated that the foregoing concepts may be variously embodied in any of a data processing system, a machine implemented method, and a computer program product in which digitally encoded program instructions are stored on one or more computer-readable data storage media for use in controlling a computer or other data processing machine to perform the required functions. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, to name but a few. When implemented on a machine comprising a CPU, the program instructions combine with the CPU to provide a particular machine that operates analogously to specific logic circuits, which themselves could be used for the invention.

Figure 11:
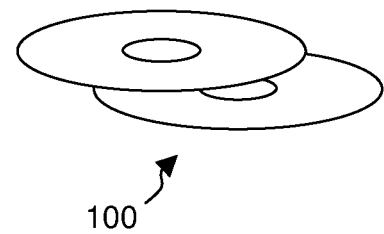
FIG. 11 is a diagrammatic illustration of example storage media that may be used to provide a computer program product for performing software analysis as disclosed herein.

Example data storage media for storing such program instructions are shown by reference numeral 100 in FIG. 11. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions of the invention either alone or in conjunction with an operating system or other software product that incorporates the required functionality. The media 100 could also be provided by portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the media 100 could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing embodiments of the method(s) and system(s) described herein.

Although various embodiments of the invention have been described, it should be apparent that many variations and alternative embodiments could be implemented in accordance with the invention. For example, although the example embodiment depicts wp analysis, it will be appreciated that other types of symbolic analysis may likewise be used to support feedback-driven call graph expansion as disclosed herein. It is understood, therefore, that the invention is not to be in any way limited except in accordance with the spirit of the appended claims and their equivalents.

What is claimed is:

1. A machine-implemented method for feedback-directed call graph expansion, comprising:
    performing symbolic analysis on an interprocedural control flow graph representation of software code;
    skipping over a virtual method call in said control flow graph;
    using information obtained from said symbolic analysis as feedback to identify a target of said virtual method call; and
    iterating said symbolic analysis on a modified version of said control flow graph that associates said target with said virtual method.

2. The method of claim 1, wherein said information represents a type constraint on said method call that is revealed by said symbolic analysis.

3. The method of claim 1, wherein said symbolic analysis comprises a backward analysis to determine a weakest precondition at an entry point of said software code based on a desired logical state at some program point of said software code.

4. The method of claim 3, wherein said virtual method call is skipped by using a special form of symbolic formula that represent constraints on said virtual method call.

5. The method of claim 4, wherein said special type of symbolic formula contains one or more skolem constants that define said constraints using existential quantifiers.

6. The method of claim 1, wherein said control flow graph contains more than one virtual method call and said method iterates said symbolic analysis for each of said virtual method calls.

7. A system, comprising:
a CPU;
a memory operatively coupled to said CPU, said memory including a storage medium tangibly embodying a program of instructions executable by said CPU to perform operations for implementing feedback-directed call graph expansion, comprising:
performing symbolic analysis on an interprocedural control flow graph representation of software code;
skipping over a virtual method call in said control flow graph;
using information obtained from said symbolic analysis as feedback to identify a target of said virtual method call; and
iterating said symbolic analysis on a modified version of said control flow graph that associates said target with said virtual method.

8. The system of claim 7, wherein said information represents a type constraint on said method call that is revealed by said symbolic analysis.

9. The system of claim 7, wherein said symbolic analysis comprises a backward analysis to determine a weakest precondition at an entry point of said software code based on a desired logical state at some program point of said software code.

10. The system of claim 9, wherein said virtual method call is skipped by using a special form of symbolic formula that represent constraints on said virtual method call.

11. The system of claim 10, wherein said special type of symbolic formula contains one or more skolem constants that define said constraints using existential quantifiers.

12. The system of claim 7, wherein said control flow graph contains more than one virtual method call and said method iterates said symbolic analysis for each of said virtual method calls.

13. A computer program product, comprising:
one or more computer-readable storage media:
program instructions stored on said one or more storage media for programming a CPU to perform operations for implementing feedback-directed call graph expansion, comprising:
performing symbolic analysis on an interprocedural control flow graph representation of software code;
skipping over a virtual method call in said control flow graph;
using information obtained from said symbolic analysis as feedback to identify a target of said virtual method call; and
iterating said symbolic analysis on a modified version of said control flow graph that associates said target with said virtual method.

14. The computer program product of claim 13, wherein said information represents a type constraint on said method call that is revealed by said symbolic analysis.

15. The computer program product of claim 13, wherein said symbolic analysis comprises a backward analysis to determine a weakest precondition at an entry point of said software code based on a desired logical state at some program point of said software code.

16. The computer program product method of claim 15, wherein said virtual method call is skipped by using a special form of symbolic formula that represent constraints on said virtual method call.

17. The computer program product of claim 16, wherein said special type of symbolic formula contains one or more skolem constants that define said constraints using existential quantifiers.

18. The computer program product of claim 13, wherein said control flow graph contains more than one virtual method call and said method iterates said symbolic analysis for each of said virtual method calls.

19. A machine-implemented method for feedback-directed call graph expansion, comprising:
performing symbolic analysis on an interprocedural control flow graph representation of software code;
skipping over virtual method calls in said control flow graph;
for each of said virtual method calls:
using information obtained from said symbolic analysis as feedback to identify a target of said virtual method call; and
iterating said symbolic analysis on a modified version of said control flow graph that associates said target with said virtual method.

20. The method of claim 19, wherein:
said information represents a type constraint on said method call that is revealed by said symbolic analysis;
said symbolic analysis comprises a backward analysis to determine a weakest precondition at an entry point of said software code based on a desired logical state at some program point of said software code;
said virtual method call is skipped by using a special form of symbolic formula that represent constraints on said virtual method call; and
said special type of symbolic formula containing one or more skolem constants that define said constraints using existential quantifiers.

* * * * *